Oct. 19, 1937.  A. J. SAFORCADA  2,096,066

BELLOWS

Filed Nov. 16, 1935

INVENTOR
Anibal J. Saforcada
BY
Ramsey & Kent
his ATTORNEYS

Patented Oct. 19, 1937

2,096,066

UNITED STATES PATENT OFFICE 2,096,066

BELLOWS

Anibal Julio Saforcada, Martinez, Argentina

Application November 16, 1935, Serial No. 50,246
In Argentina April 30, 1935

8 Claims. (Cl. 137—156.5)

The present invention about to be described relates primarily to bellows and more especially to a mechanical element useful in the construction of bellows.

A bellows built up in accordance with the present invention comprises a sectional hermetically sealed construction, and is of such nature as to be capable of withstanding high fluid pressure. It, therefore, may be useful for various purposes where such conditions are encountered.

The primary unit or element in the bellows construction comprises a section constructed of materials used in and according to practices well known in the art of making pneumatic tire casings for automobiles. This section comprises a piece of rubber or other elastic material internally reenforced with cords, textiles or other materials well known in the manufacture of tire casings. The device comprises what may be termed a bellows section having a radial cross-section through one half of the device which is a C-shaped channel with the arch of the C-shaped portion forming the crown and the ends of the C-shaped portion being elongated into extra length beads for anchoring purposes.

The device is illustrated in the preferred form, but it is to be understood that the invention may be embodied in other equivalent forms or structures.

Other and further objects of the present invention will in part be obvious and will in part be pointed out hereinafter by reference to the accompanying drawing in which like parts are indicated by like characters.

Figures 1, 2:
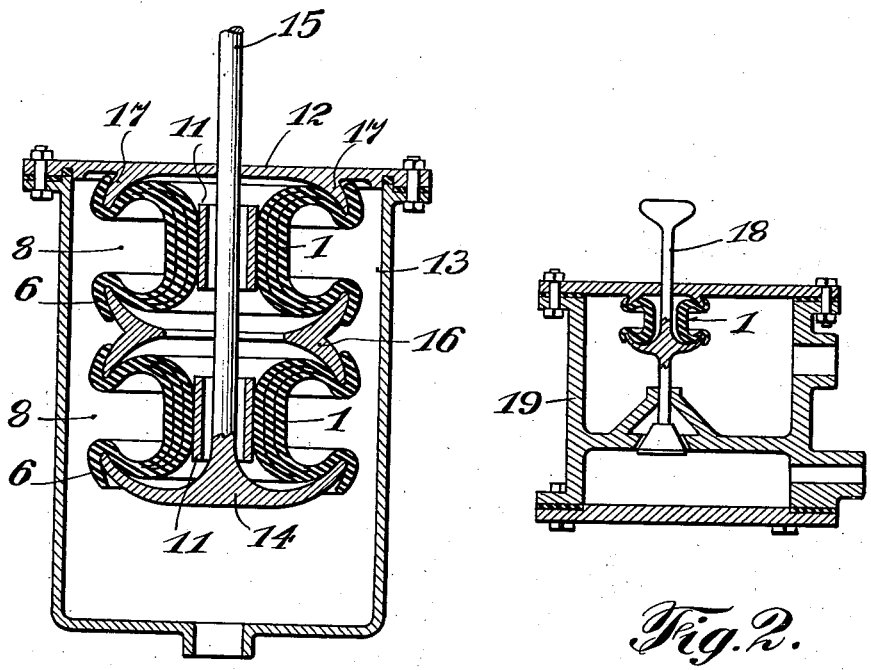
Fig. 1 is a view illustrating a cross-section through one embodiment of the present invention comprising a sectional bellows arranged within a pressure chamber.
Fig. 2 illustrates another construction in which the present invention is utilized and wherein the bellows section is utilized as the sealing member for the stem of a valve operating in the pressure chamber.

The section 1 comprises a rubber construction reenforced by textiles, cords or other constructions 2 commonly used in the reenforcement of rubber pneumatic tire casings such as are utilized on automobiles. This section 1 constitutes a ring having radial cross-section in the form of a removable clincher rim automobile tire casing wherein the crown 4 of the member, in the present embodiment, is toward the center and the open channel 8 of the member is at the periphery thereof. The edges of this member are folded at 7 to provide lips or extensions 6 which, with the side walls of the section, form an anchor pocket 5. This pocket 5 is adapted to operate as an annular coupling pocket that may receive lips 17 attached to the lid 12 of the chamber 13 (Fig. 1) and may also receive the lips from the ring member 16 which comprises a rigid member acting as a coupling between adjacent rubber sections 1. The end of the terminal bellows section may be closed by a disc 14 having lips that extend within the annular passage 5 in the terminal bellows section 1. Where desired, the disc 14 may be operatively connected with a load member, such as a rod 15 so that movements of the disc 14 are communicated to the rod similar to movements of a piston being connected with a piston rod. The ring members 16 are somewhat like an inverted wheel rim adapted to hold a clincher tire. These members 16 are double cupped members with the rims of the cups engaging the anchor pockets 5 of adjacent sections 1.

Figures 3, 4:
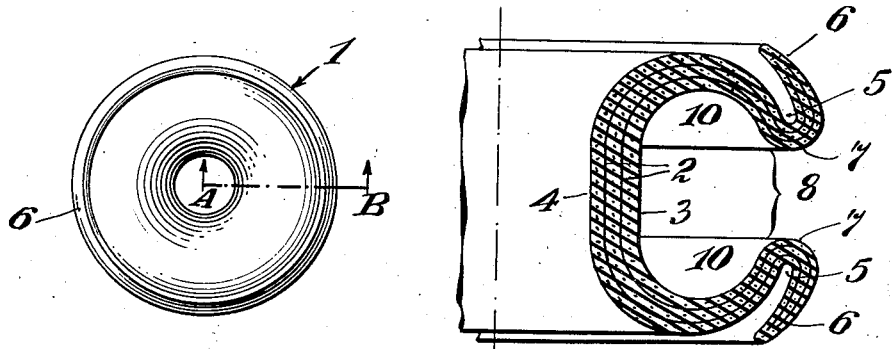
Fig. 3 is a plan view of one of the bellows sections of the device.
Fig. 4 is a sectional view on the radial line A—B of Fig. 3 looking in the direction of the arrows and illustrates the radial cross-section of a section of the bellows as being similar to the radial cross-section of a tire casing.

In order to sustain the sections 1 (as shown in the present embodiment) against collapsing when subjected to high pressure, reenforcing tubes 11 may be set against the crown 4 of the bellows section 1. As illustrated in Fig. 1, the bellows construction is enclosed within the chamber 13 which is provided with an outlet 9 so that pressure may be accumulated within the chamber. When pressure accumulates, it is communicated to the bellows sections and to the disc 14. The pressure on the portions 3 and 10 (Fig. 4) of the bellows sections and on the disc 14 tends to collapse the structure and thereby force the piston rod 15 outwardly from the chamber so that the load on the rod 15 is sustained by the air pressure acting on the bellows.

The effect of the air pressure in the chamber 13 (Fig. 1) on the bellows sections 1 is substantially the same as the effect of internal air pressure on a tire-like construction in that the pressure is effective on the bellows sections by pressing at right angles to the groove surfaces 3 and 10 through the open channel 8. In other words, the bellows sections whether turned inwardly or outwardly have radial cross-sections that are substantially the same as pneumatic tire casing cross-sections, and sustain fluid pressure in the same way.

The present construction, as more especially illustrated in Fig. 1, is adapted for use in most places where a piston and cylinder construction is utilized. Other adaptations with or without the pressure chamber will be apparent to those skilled in the art.

The construction illustrated in Fig. 2 shows a member 19 divided into a pair of chambers 20 and 21 separated by a partition 22 and with communicating passages 23 and 24 leading to the chambers 20 and 21 respectively. A valve 24 is positioned between the chambers 20 and 21 and is connected with a valve stem 18. The lid 25 of the chamber 20, through which the valve stem 18 extends, is provided with an annular lip 26 surrounding the valve stem opening. The valve stem 18 also carries a lip member 27. A bellows section 1 is mounted between the lip members 26 and 27 in such manner as to form an elastic hermetic sealed wall surrounding the valve stem and thereby effectively preventing escape of fluid from within the chamber and around the valve stem. This Fig. 2 is merely a further illustration of a use of the bellows section.

The present invention facilitates the economic construction of sectional bellows which are of great strength and flexibility.

Having described my invention, what I claim is:

1. A bellows construction comprising a plurality of hollow flexible ring sections, the radial cross-section of each section being substantially C-shaped and having reenforced rubber side walls, each hollow flexible ring section having an open channel in the periphery thereof and the crown of each section being the inner face thereof, means connecting the edges of the side walls of one section with the edges of the side wall of an adjacent section in such manner that when said sections are subjected to pressure, the side walls of a single section move relatively to each other while the adjoined side walls of adjacent sections are relatively immovable with relation to each other.

2. A bellows construction comprising a plurality of grooved flexible ring sections, the radial cross-section of each section being substantially C-shaped and having rubber side walls reenforced by textile material embedded in the rubber, each grooved flexible ring section having an open channel in the periphery thereof and the crown of each section being the inner face thereof, and means connecting terminal portions of adjoining side walls of adjacent sections in such manner that pressure acting within the groove of each section tends to cause the side walls of such section to move away from each other.

3. A bellows comprising hollow flexible ring sections, each having a substantially C-shaped radial cross-section, each hollow flexible ring section having an open channel in the periphery thereof and the crown of each section being the inner face thereof, a rigid ring member between the flexible ring sections and joining adjacent edges of adjoining flexible sections, and a load member connected with said sylphon.

4. As an article of manufacture, a flexible bellows section comprising a hollow rubber ring reenforced with textile materials and having a substantially C-shaped radial cross-section, each hollow rubber ring having an open channel in the periphery thereof and the crown of each ring being the innner surface thereof.

5. An article of manufacture comprising a hollow flexible ring section of a bellows adapted to withstand fluid pressure, said section comprising a rubber member reenforced with textile means, said flexible ring section having an open channel in the periphery thereof and the crown of said section being the inner face thereof, the sides of said member being more flexible than the crown thereof, said member having a substantially C-shaped radial cross-section.

6. A bellows construction comprising an adjacent pair of hollow flexible sections, said flexible sections having reenforced rubber side walls and a substantially rigid annular ring between said adjacent flexible sections, each hollow flexible section having an open channel in the periphery thereof and the crown of each section being the inner face thereof, the flexibility of said bellows being limited substantially to said flexible rubber sections which may be collapsed or extended without collapsing or extending said substantially rigid ring section.

7. A bellows construction comprising adjacent pairs of hollow flexible sections, each of said flexible sections having reenforced rubber side walls, a substantially rigid annular ring between adjacent flexible sections, each flexible section having an open channel in the periphery thereof and the crown of each section being the inner face thereof, a rigid member mounted within each section and contacting the crown thereof in such manner as to support said crown against external forces tending to move said crown toward the center of the section.

8. A bellows construction comprising pairs of adjacent hollow flexible sections, each of said flexible sections having reenforced rubber side walls and an open channel in the periphery of said section and the crown of each section being the inner face thereof, rigid members connected to the side walls of said sections adjacent the said open channel, the faces of the said rigid members being curved to support the adjacent side walls when the same are expanded by fluid pressure applied to said sections through said open channel.

ANIBAL JULIO SAFORCADA.